United States Patent
Iwata

(10) Patent No.: US 7,349,061 B2
(45) Date of Patent: Mar. 25, 2008

(54) MANUFACTURING METHOD OF LIQUID CRYSTAL SUBSTRATE AND MANUFACTURING DEVICE OF LIQUID CRYSTAL SUBSTRATE

(75) Inventor: Yuji Iwata, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 11/133,202

(22) Filed: May 20, 2005

(65) Prior Publication Data

US 2005/0275789 A1    Dec. 15, 2005

(30) Foreign Application Priority Data

Jun. 10, 2004    (JP) ............... 2004-172541

(51) Int. Cl.
G02F 1/13    (2006.01)
G02F 1/1337   (2006.01)

(52) U.S. Cl. .................... 349/187; 349/123
(58) Field of Classification Search ........... 349/187
See application file for complete search history.

(56) References Cited

U.S. PATENT DOCUMENTS

| | | | |
|---|---|---|---|
| 6,992,746 B2* | 1/2006 | Okuyama | 349/189 |
| 2004/0083446 A1* | 4/2004 | Hasei | 716/21 |
| 2004/0090592 A1* | 5/2004 | Jung et al. | 349/187 |
| 2004/0201818 A1* | 10/2004 | Yamamoto et al. | 349/187 |
| 2004/0202794 A1* | 10/2004 | Yoshida | 427/466 |
| 2004/0207800 A1 | 10/2004 | Hiruma et al. | |
| 2004/0246420 A1* | 12/2004 | Morimoto et al. | 349/124 |
| 2006/0211249 A1* | 9/2006 | Nakada et al. | 439/690 |
| 2006/0260543 A1 | 11/2006 | Hiruma et al. | |

FOREIGN PATENT DOCUMENTS

| | | |
|---|---|---|
| CN | 1475313 | 2/2004 |
| CN | 1501132 | 6/2004 |
| JP | A-06-196546 | 7/1994 |
| JP | A-09-105939 | 4/1997 |
| JP | A 10-197873 | 7/1998 |
| JP | A-2002-273868 | 9/2002 |
| JP | A 2003-172814 | 6/2003 |
| JP | A-2004-122114 | 4/2004 |
| KR | 2002-0061521 | 7/2002 |

* cited by examiner

*Primary Examiner*—Andrew Schechter
*Assistant Examiner*—Matthew P Lawson
(74) *Attorney, Agent, or Firm*—Oliff & Berridge, PLC

(57) ABSTRACT

Aspects of the invention can include an imaging step for imaging a region including a plurality of substrates arranged on a pallet having a plurality of housing units by an imaging unit, an actual applying region detecting step for detecting a region corresponding to the plurality of substrates as an actual applying region based on the result of the imaging in the imaging step, and an applying step for applying an orientation film ink from an ink jet head to the plurality of substrates based on the actual applying region. Accordingly, the invention can improve yield.

4 Claims, 7 Drawing Sheets

RELATED ART

RELATED ART

MANUFACTURING METHOD OF LIQUID CRYSTAL SUBSTRATE AND MANUFACTURING DEVICE OF LIQUID CRYSTAL SUBSTRATE

BACKGROUND

Aspects of the invention can relate to a manufacturing method of a liquid crystal substrate and a manufacturing device of a liquid crystal substrate. Particularly, the invention can relate to a manufacturing method of a liquid crystal substrate and a manufacturing device of a liquid crystal substrate which can improve the yield.

Related art methods apply an orientation film ink to a substrate by an ink jet method and then form an orientation film on the substrate, to manufacture a liquid crystal substrate. See, for example, Japanese Unexamined Patent Publication No. H10-197873. FIG. 5 is a plane view explaining the related art manufacturing method of a liquid crystal substrate. FIG. 6 is a cross sectional view cut along the line X-X' shown in FIG. 5.

A pallet 20 is formed with housing units $21_1$ through $21_{25}$ in matrix form. In these housing units $21_1$ through $21_{25}$, the substrates $30_1$ through $30_{25}$ are respectively housed in a positioned state. An ink jet head 40 is formed movably on the pallet 20, and the orientation film ink 50 is discharged to the substrates $30_1$ through $30_{25}$ by the ink jet method.

In the above-described configuration, the substrates $30_1$ through $30_{25}$ are housed in the housing units $21_1$ through $21_{25}$ of the pallet 20. Next, the ink jet head 40 is movably controlled, and sequentially discharges an orientation film ink 50 to the substrates $30_1$ through $30_{25}$. Therefore, to the respective substrates $30_1$ through $30_{25}$, the orientation film ink 50 can be applied. Next, the orientation film ink 50 respectively applied to the substrates $30_1$ through $30_{25}$ is dried, and then, on the substrates $30_1$ through $30_{25}$, the orientation film is formed. After the substrates $30_1$ through $30_{25}$ are dried, they become liquid crystal substrates.

Incidentally, as described in FIG. 5, in the housing units $21_1$ through $21_{25}$, as the substrates $30_1$ through $30_{25}$ is in a positioned state orderly in the central part of the housing units $21_1$ through $21_{25}$ as described in the figure, the orientation film ink 50 is applied to the normal position of the substrates $30_1$ through $30_{25}$.

However, due to minute space between the housing units $21_1$ through $21_{25}$ and the substrates $30_1$ through $30_{25}$, as described in FIG. 7, compared to the standard arrangement position (dashed line), there are cases that the substrates $30_1$ through $30_{25}$ are arranged offset to right and left, top and bottom, and sideways. Here, the orientation film ink 50 is designed to be applied to the predetermined applying region (inside the dashed line). Therefore, in these cases, the orientation film ink 50 will not be applied accurately to the predetermined applying region of the substrates $30_1$ through $30_{25}$, and caused a problem of poor yield.

SUMMARY

Aspects of the invention can provide a manufacturing method of a liquid crystal substrate and a manufacturing device of a liquid crystal substrate which can improve the yield.

Aspects of the invention can include an imaging step for imaging a region including a plurality of substrates arranged on a pallet having a plurality of housing units, an actual applying region detecting step for detecting a region corresponding to the plurality of substrates as an actual applying region based on the result of the imaging, and an applying step for applying an orientation film ink to the plurality of substrates based on the actual applying region.

Moreover, the invention can include an imaging device for imaging a region including a plurality of substrates arranged on a pallet having a plurality of housing units, an actual applying region detecting device for detecting a region corresponding to the plurality of substrates as an actual applying region based on the result of the imaging, and an applying device for applying an orientation film ink to the plurality of substrates based on the actual applying region.

According to the invention, by detecting a region corresponding to the plurality of substrates as the actual applying region based on the result of imaging the region including the plurality of substrates arranged on the pallet having the plurality of housing units, and by applying the orientation film ink to the plurality of substrates based on the actual applying region, regardless of the positions of the substrates with respect to the housing units, it is possible to accurately apply the orientation film ink to the substrates, therefore it is effective for improving the yield.

BRIEF DESCRIPTION OF THE DRAWINGS

This invention will be described with reference to the accompanying drawings, wherein like numerals reference like elements, and wherein.

DETAILED DESCRIPTION OF EMBODIMENTS

An exemplary embodiment of a manufacturing method of a liquid crystal substrate and a manufacturing device of a liquid crystal substrate of the invention will now be described in detail with reference to the accompanying drawings. Additionally, it should be understood that the invention will not be limited by the exemplary embodiment.

Figure 1:
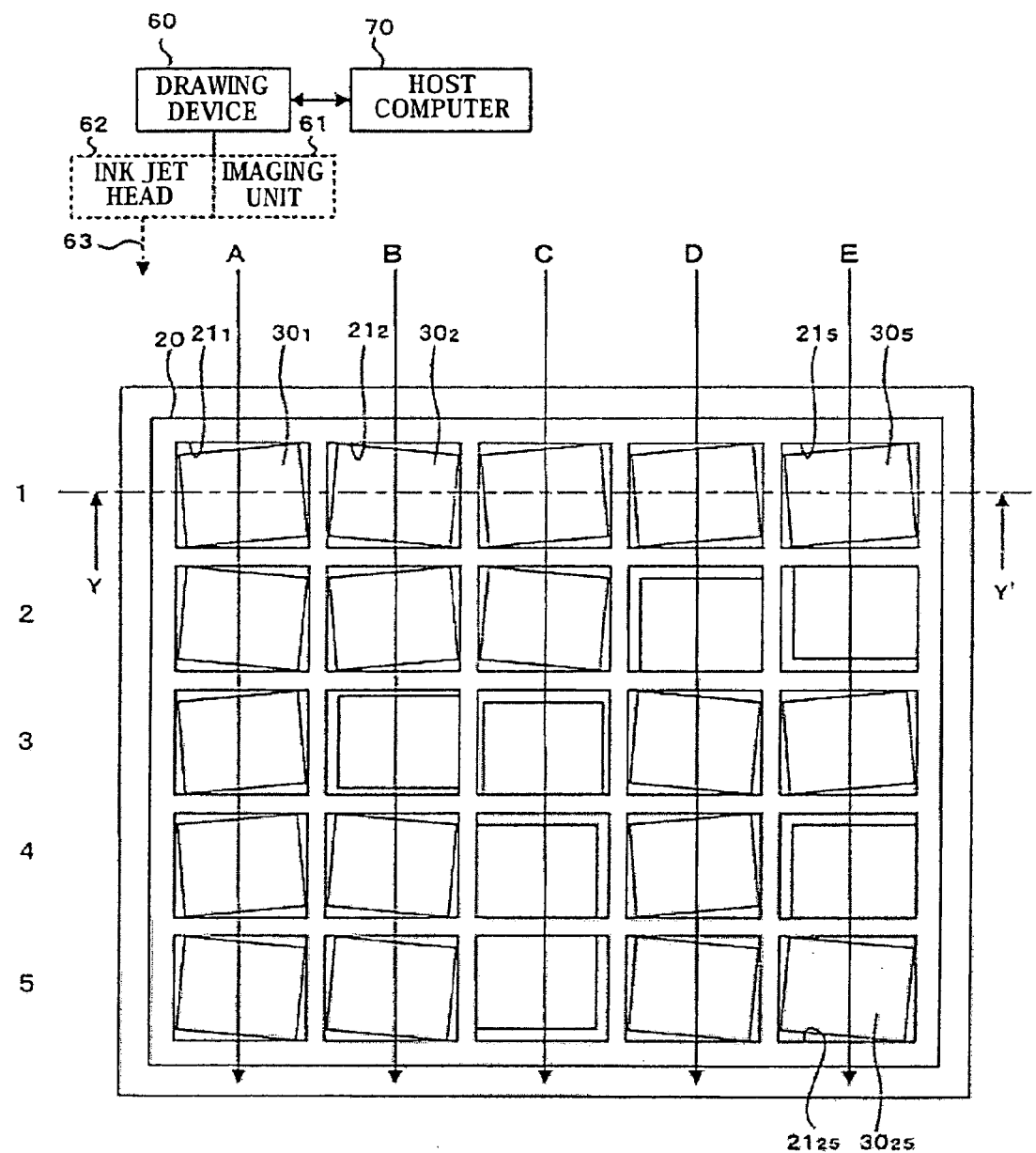
FIG. 1 is a plane view showing the configuration of an embodiment of the present invention.
Figure 2:
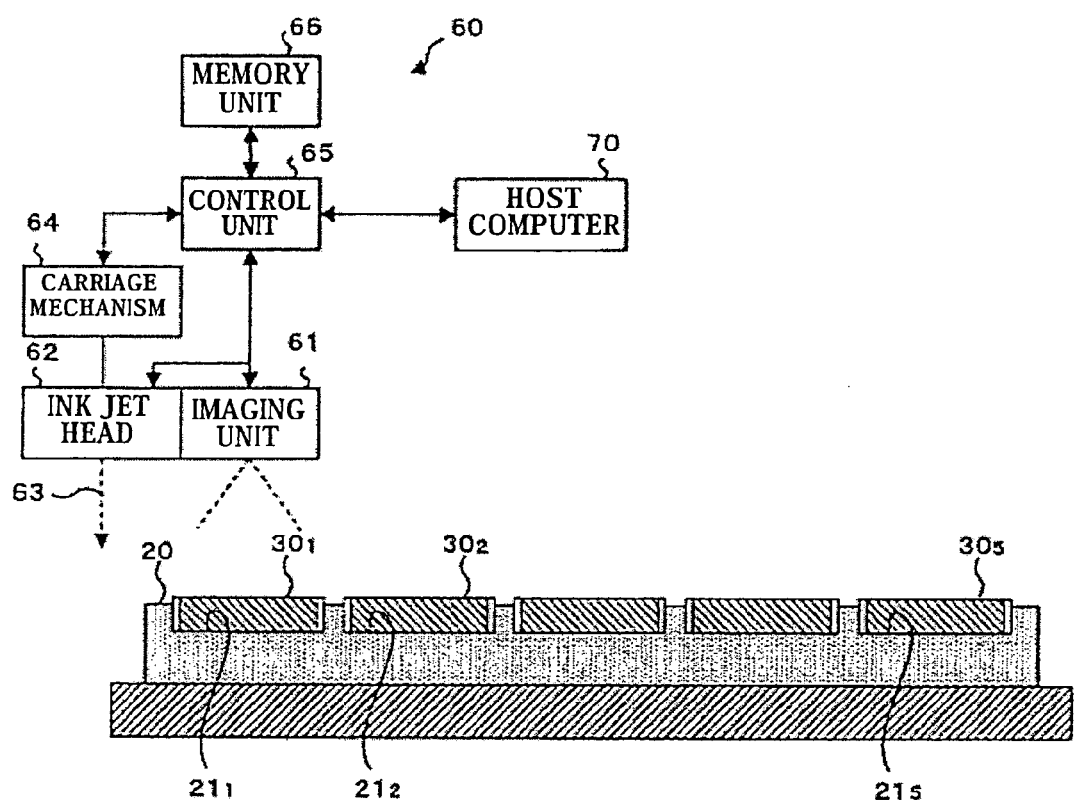
FIG. 2 is a cross sectional view cut along the line Y-Y' shown in FIG. 1.
Figure 5:
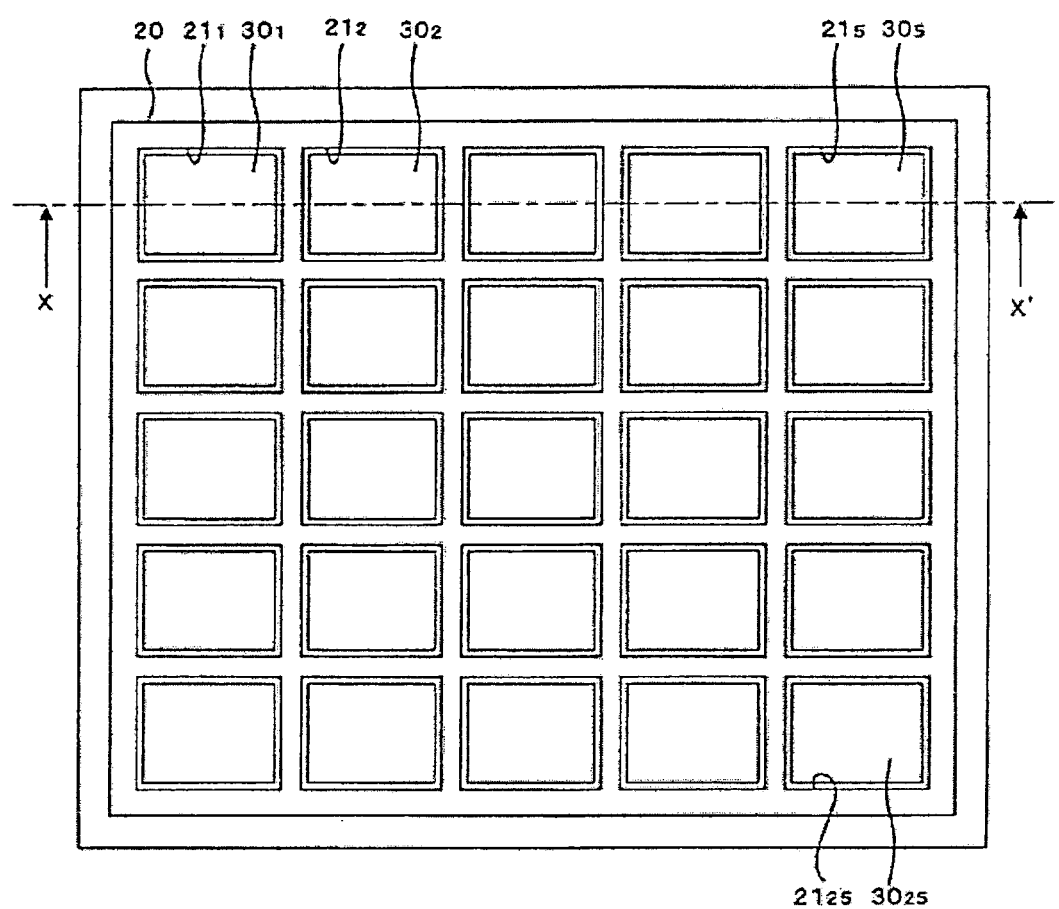
FIG. 5 is a plane view explaining the related art manufacturing method of the liquid crystal substrate.
Figure 6:
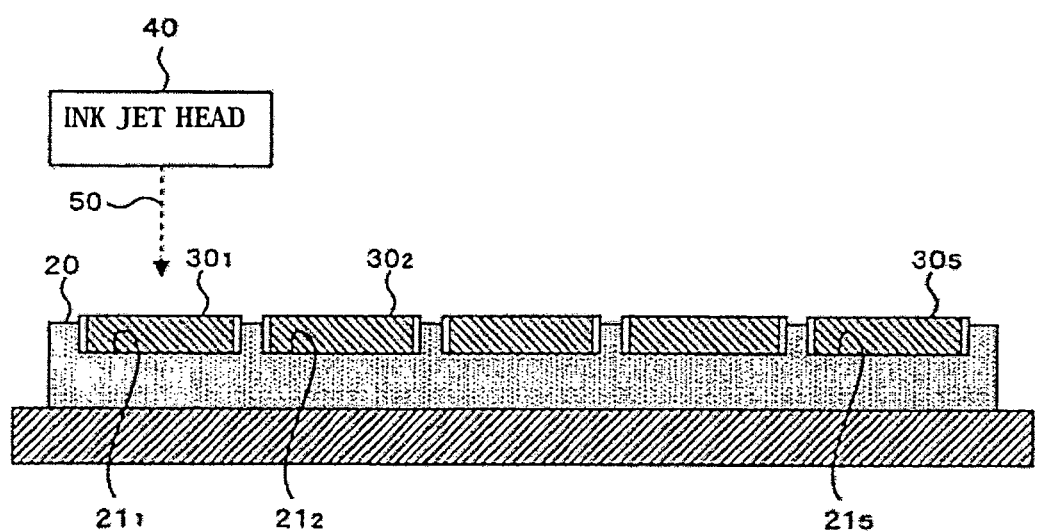
FIG. 6 is a cross sectional view cut along the line X-X' shown in FIG. 5.

FIG. 1 is a plane view showing the configuration of an exemplary embodiment of the invention. FIG. 2 is a cross sectional view cut along the line Y-Y' shown in FIG. 1. A manufacturing method of a liquid crystal substrate and a manufacturing device of a liquid crystal substrate will be described hereunder. In FIG. 1 and FIG. 2, parts which correspond to those of FIG. 5 and FIG. 6 will be indicated by the same reference numerals, and the detailed description will be omitted. In FIG. 2, in lieu of an ink jet head 40 described in FIG. 6, a drawing device 60 and a host computer 70 are provided.

The drawing device 60 is a device for drawing a predetermined pattern by an orientation film ink 63 with respect to the substrates $30_1$ through $30_{25}$. The host computer 70 is coupled to the drawing device 60, and supplies pallet arrangement data or the like to the drawing device 60. The pallet arrangement data is data concerning the arrangement of the housing units $21_1$ through $21_{25}$ in a pallet 20 as described in FIG. 1, and for example, it is represented in x-y coordinates.

An imaging unit 61 of the drawing device 60 as described in FIG. 2 is movably provided on the pallet 20, and in rows 1 through 5 and lines A through E (refer to FIG. 1), a function of imaging a region including the housing units $21_1$ through $21_{25}$ and the substrates $30_1$ through $30_{25}$ are provided along the lines A through E. An ink jet head 62 is movably provided on the pallet 20, and applies an orientation film ink 63 to the substrates $30_1$, through $30_{25}$ by an ink jet method.

A carriage mechanism 64 is a mechanism to move an imaging unit 61 and the ink jet head 62, and is controlled by a control unit 65. The control unit 65 controls each part. The detail of the movement of the control unit 65 will be described below. A memory unit 66 stores each type of data used by the control unit 65.

Figure 3:
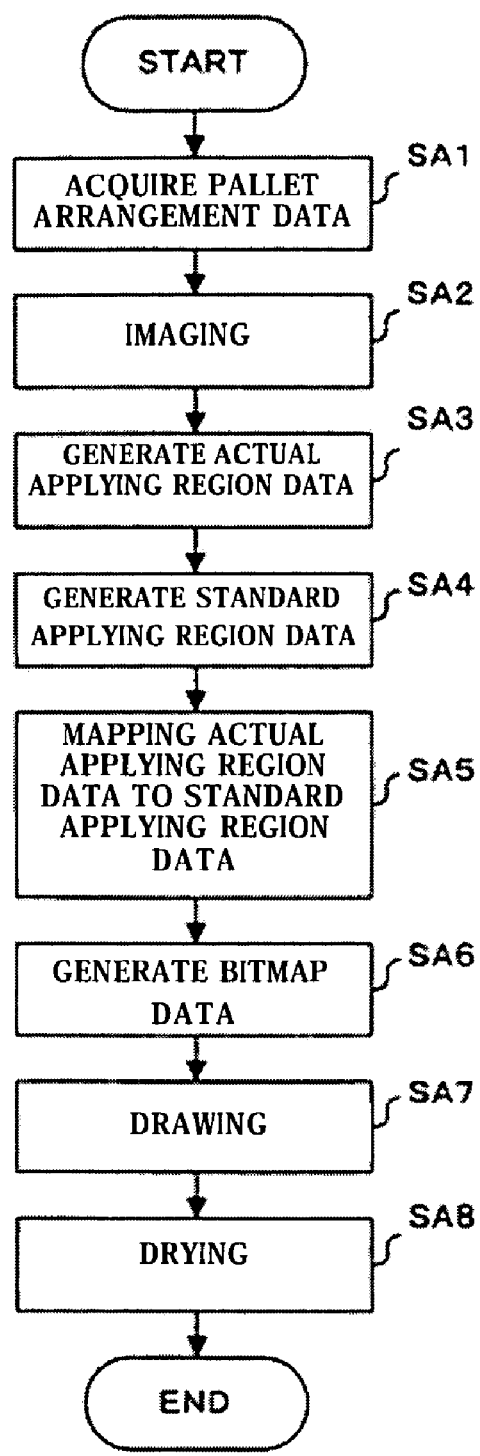
FIG. 3 is a flowchart explaining the movement of the exemplary embodiment.
Figure 7:
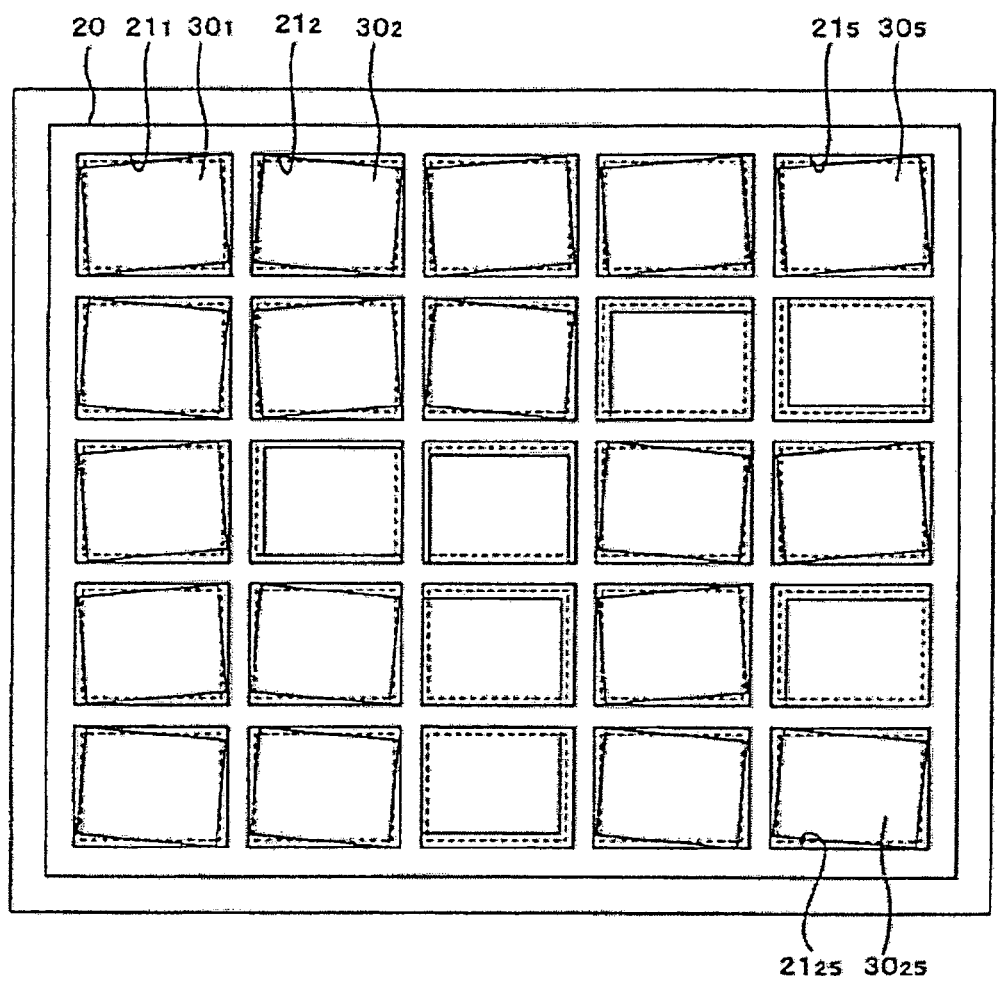
FIG. 7 is a plane view explaining the problems of the related art manufacturing method of the liquid crystal substrate.

Next, the movement of the exemplary embodiment will be explained by referring to the flowchart described in FIG. 3. Hereunder, as described in FIG. 1, compared to a standard arrangement position (dashed line: refer to FIG. 7), the movement in case where the substrates $30_1$ through $30_{25}$ is arranged offset to right and left, top and bottom, and sideways, will be explained. In a step SA1, the control unit 65 acquires pallet arrangement data from the host computer 70, and stores in the memory unit 66.

In a step SA2, the control unit 65 controls the carriage mechanism 64, moves the imaging unit 61 along the lines A through E as described in FIG. 1, and images a region including the housing units $21_1$ through $21_{25}$ and the substrates $30_1$ through $30_{25}$. Moreover, the control unit 65 subsequently stores in the memory unit 66 the image data from the imaging unit 61.

In a step SA3, based on image data, the control unit 65 generates the region corresponding to the region of the substrates $30_1$ through $30_{25}$ in the pallet 20 as an actual applying region data by image processing, such as edge detecting.

In a step SA4, based on the pallet arrangement data stored in the memory unit 66, the control unit 65 generates a standard applying region data corresponding to the region of the housing units $21_1$ through $21_{25}$. In a step SA5, the control unit 65 maps the actual applying region data generated in the step SA3 to the standard applying region data generated in the step SA4.

Figure 4:
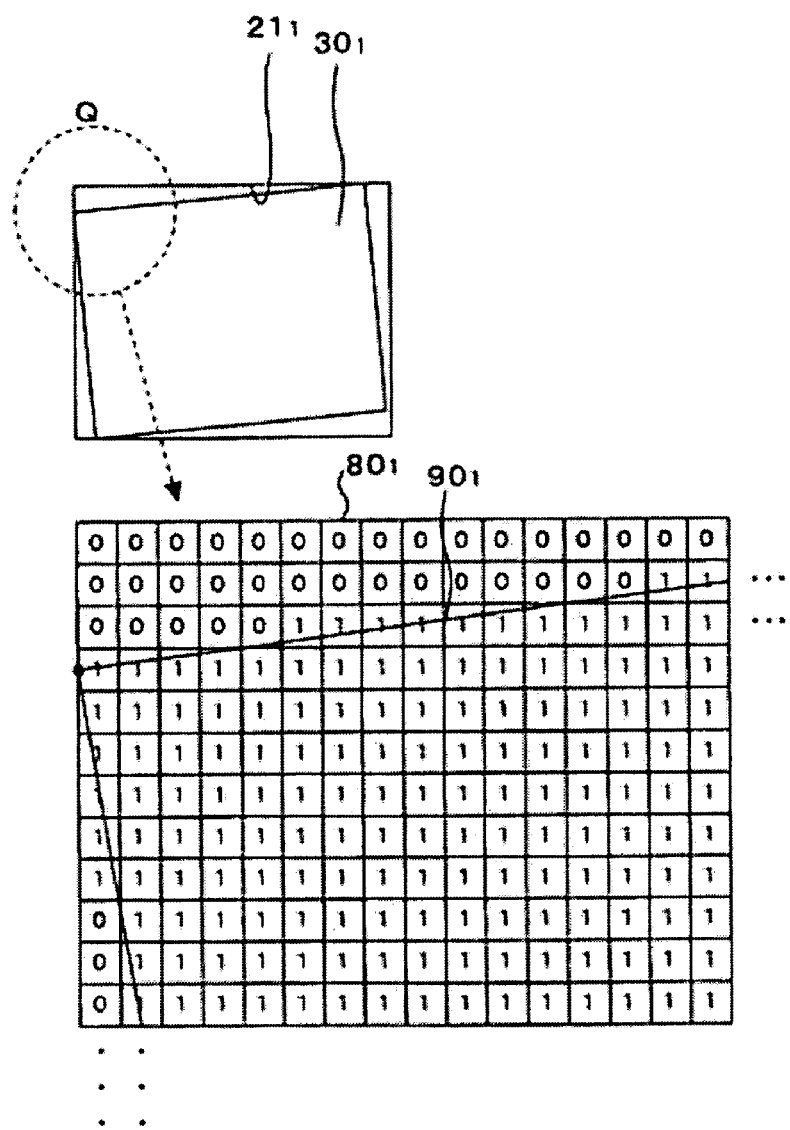
FIG. 4 is a diagram explaining the movement of the exemplary embodiment.

Specifically, as described in FIG. 4, for example, the control unit 65 maps an actual applying region data $90_1$, corresponding to the region of the substrate $30_1$ to a standard applying region data $80_1$, corresponding to the region of the housing unit $21_1$. Moreover, the control unit 65 also maps regarding other regions in a similar way.

In a step SA6, based on the mapping result of the step SA5, the control unit 65 generates bitmap data by making a dot region corresponding to the actual applying region data as 1 (applying bit) and other dot region as 0 (non-applying bit), out of the standard applying region data. Moreover, the control unit 65 also generates bitmap data regarding other regions in a similar way.

Specifically, as described in FIG. 4, the control unit 65 generates bitmap data by making a dot region corresponding to the actual applying region data $90_1$ as 1 (applying bit) and other dot region as 0 (non-applying bit), out of the standard applying region data $80_1$. The 1 dot region is a region where the orientation film ink is applied. On the other hand, the 0 dot region is a region where the orientation film ink is not applied.

In a step SA7, based on the bitmap data generated at the step SA6, the control unit 65 controls the carriage mechanism 64 and the ink jet head 62, and execute the drawing.

Accordingly, by the carriage mechanism 64, the ink jet head 62 as described in FIG. 2 is movably controlled, and sequentially discharges the orientation film ink 63 to the 1 dot region corresponding to the substrates $30_1$ through $30_{25}$. Therefore, to the respective substrates $30_1$ through $30_{25}$, the orientation film ink 63 is applied.

In a step SA8, the orientation film ink 63 respectively applied to the substrates $30_1$ through $30_{25}$ are dried, and then, on the substrates $30_1$ through $30_{25}$, the orientation film is formed. After the substrates $30_1$ through $30_{25}$ are dried, they become liquid crystal substrates.

As described above, in the exemplary embodiment, by detecting the region corresponding to the plurality of substrates $30_1$ through $30_{25}$ as the actual applying region based on the result of imaging the region including the plurality of substrates $30_1$ through $30_{25}$ arranged on the pallet 20 having the plurality of housing units $21_1$ through $21_{25}$, and by applying the orientation film ink 63 to the plurality of substrates $30_1$ through $30_{25}$ based on the actual applying region, regardless of the positions of the substrates $30_1$ through $30_{25}$ with respect to the housing units $21_1$ through $21_{25}$, it is possible to accurately apply the orientation film ink 63 to the substrates $30_1$ through $30_{25}$, therefore it is effective for improving the yield.

As described above, the manufacturing method of the liquid crystal substrate and the manufacturing device of the liquid crystal substrate of the invention are useful for improving the yield when drawing the orientation film ink.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A manufacturing method of a liquid crystal substrate, comprising:
    acquiring pallet arrangement data;
    imaging a region including a plurality of substrates arranged on a pallet having a plurality of housing units;
    detecting a region corresponding to the plurality of substrates as an actual applying region based on the result of imaging;
    generating bit map data by making a dot region correspond to the actual applying region;
    generating a standard applying region based on the pallet arrangement data;
    comparing the bit map data to the standard applying region; and
    applying an orientation film ink to the plurality of substrates based on the actual applying region.

2. The manufacturing method of a liquid crystal substrate according to claim 1, further including,
    in a standard applying region corresponding to the plurality of housing units, generating bitmap data by allocating an applying bit to a region corresponding to the actual applying region and a non-applying bit to a region other than the actual applying region; and in applying the orientation film ink, the orientation film ink being applied to the plurality of substrates based on the bitmap data.

3. A manufacturing device of a liquid crystal substrate, comprising:
- an imaging device that images a region including a plurality of substrates arranged on a pallet having a plurality of housing units;
- a standard applying region based on the pallet arrangement data;
- an actual applying region detecting device that detects a region corresponding to the plurality of substrates as an actual applying region based on the result of the imaging;
- bit map data generated by making a dot region correspond to the actual applying region;
- an applying device that applies an orientation film ink to the plurality of substrates based on the actual applying region, when compared to the standard applying region.

4. The manufacturing device of a liquid crystal substrate according to claim 3, further comprising:
- in a standard applying region corresponding to the plurality of housing units, a bitmap data generating device that generates bitmap data by allocating an applying bit to a region corresponding to the actual applying region and a non-applying bit to a region other than the actual applying region; and
- in the applying device, the orientation film ink is applied to the plurality of substrates based on the bitmap data.

* * * * *